Fig_2

INVENTORS
HARRY RUBEN AND
EUGENE C. KALKMAN
ATTORNEY

Patented Aug. 10, 1954

2,686,304

UNITED STATES PATENT OFFICE 2,686,304

OMNIRANGE RADIO NAVIGATION RECEIVER

Harry Ruben, Philadelphia, Pa., and Eugene C. Kalkman, Haddonfield, N. J., assignors to Radio Corporation of America, a corporation of Delaware Application February 23, 1951, Serial No. 212,217

10 Claims. (Cl. 343—102)

This invention relates to navigational systems in which signal intelligence, which is dependent upon the phase relation of a pair of signals, is transmitted from one station to another.

In an omni-range navigation system, for example, a ground omni-station furnishes bearing information, relative to the ground station, to aircraft carrying omni-range receiving equipment which aircraft are in an area serviced by the omni-station. The system also provides course guidance between the omni-station and any point within its service area.

The ground station radiates a reference phase signal of constant phase and a variable phase signal which signal phase varies as the electromagnetic fields associated with the radiating antenae of the ground station simultaneously increase and decrease in the various quadrants. The phase relation of the signals is zero when the scanned field of the antennae passes through north. The degree of phase shift as seen by aircraft receiving the signals depends upon the bearing of the aircraft from the omni-station. The transmitted reference and variable phase signals received by the aircraft are, after suitable reception, subsequently applied to a phase comparison circuit and a signal is obtained therefrom to provide an indication of the bearing of the aircraft.

Previous omni-range receivers utilizing phase comparison circuits compare signals of the order of 30 cycles per second. Such comparators generally require iron core transformers which materially add to the weight of the omni-range receiver. A further disadvantage of existing receivers is that a 30 cycle comparison arrangement involves excessive heating of component parts and necessitates associated temperature rise compensating means. These receivers also generally require at least two indicating meters to be observed by the pilot or navigator. One meter indicates whether a plane is approaching or leaving the ground omni-station, removing the possibility of 180° ambiguity of the navigational information, while the second meter may indicate if the aircraft is on or off a given course bearing.

The instant invention obviates these difficulties by effectively comparing the signal phases at a relatively high sub-carrier frequency which amplitude-modulates an R.-F. carrier transmitted by the ground station and by providing simplified circuitry enabling navigation by viewing of a single indicating meter.

It is an object of the invention to provide an improved receiver for receiving signal intelligence dependent upon the phase relation of a pair of transmitted signals.

Another object of the instant invention is to provide a simplified omni-range radio navigation system receiver.

Another object of the invention is to provide an omni-range radio navigation system receiver not requiring equipment temperature rise compensation.

Another object of the invention is to provide an omni-range radio navigation system receiver having reduced cost.

A further object of the invention is to provide an omni-range navigation system receiver having reduced weight.

According to the present invention, the ground omni-station transmits two signals. A 30 cycle reference signal frequency-modulates a 9.96 kilocycle sub-carrier which in turn amplitude-modulates an R.-F. carrier, and a 30 cycle variable phase signal space-modulates the same R.-F. carrier. At the aircraft receiver, the sub-carrier signal frequency modulated by the reference signal is separated from the R.-F. carrier, and is applied to a multigrid gating tube. The 30 cycle variable phase signal is similarly separated from the R.-F. carrier. Rectification and clipping of the variable phase signal produces substantially a square wave with the positive peaks removed and the negative peaks flattened. This modified variable phase signal is then coupled to the same multigrid tube and gates bursts of the reference phase frequency modulated sub-carrier signal. The output from the gating tube is coupled to a balanced discriminator and a D.-C. output voltage, the magnitude of which depends upon the phasing of the variable phase signal with respect to the reference phase signal, is derived therefrom. The D.-C. voltage is applied to the input to a D.-C. amplifier. A suitably calibrated indicating device may be connected to the amplifier to provide a means for translating the phase difference between the reference and variable phase signals into a useful navigational indication.

Auxiliary circuitry is disclosed, according to the invention, enabling the pilot of the aircraft to navigate satisfactorily by viewing a single indicating device which may indicate whether he is flying to or from the ground station and also whether or not he is on course.

The invention will be described in greater detail with reference to the accompanying drawing of which:

Figure 1:
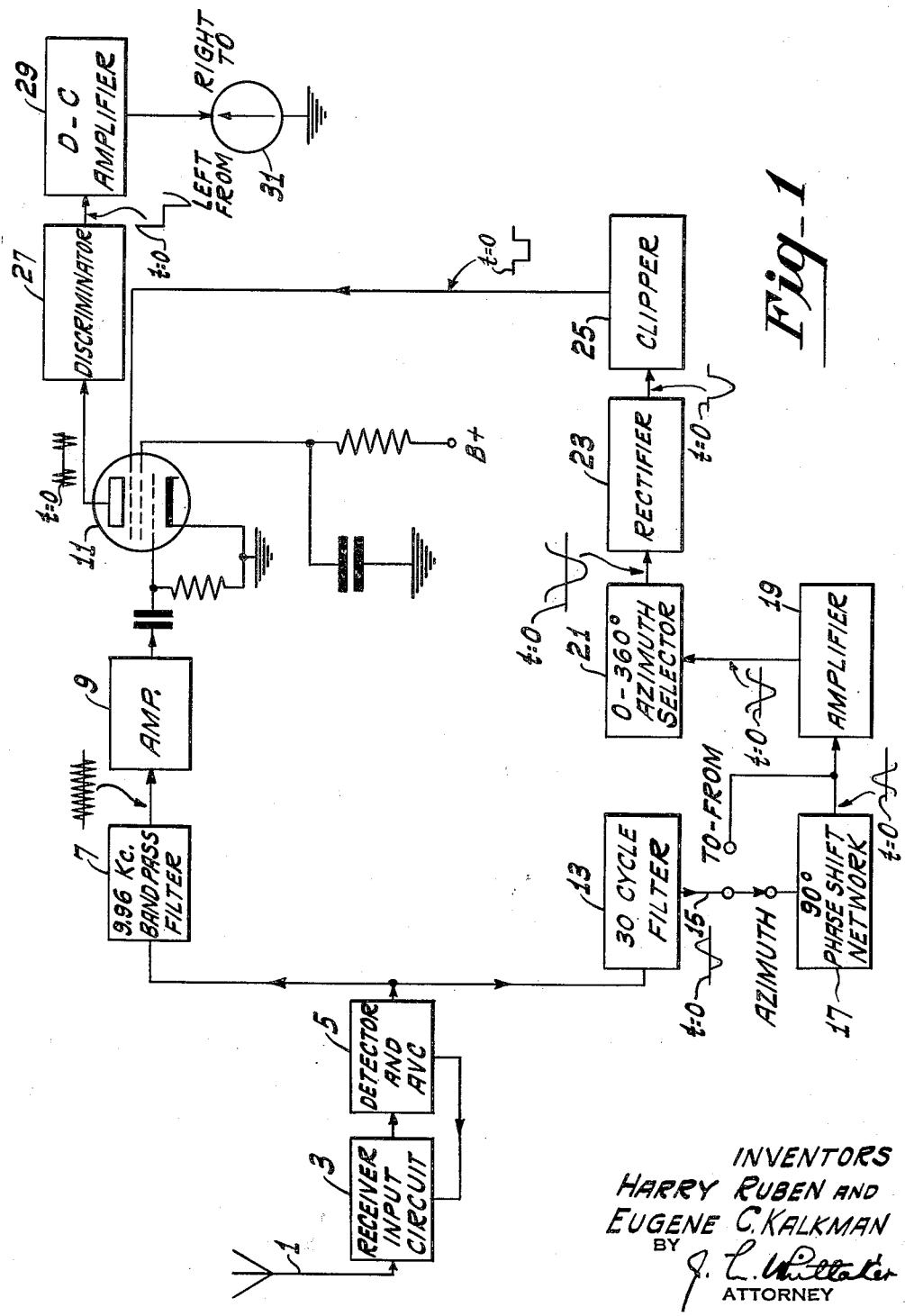
Fig. 1 is a block schematic diagram of an omnirange navigation system receiver according to the invention, carried by an aircraft flying a 0° course and located at 180° with respect to the omni-station.

Referring to Fig. 1, the reference and variable phase signals, each modulating the ground station R.-F. carrier, are received by a particular aircraft carrying an omni-range receiver, according to the invention. The signals are coupled from the receiving antenna 1 to a receiver input circuit 3 from which intermediate-frequency signals are obtained. The intermediate-frequency signal is coupled to a detector 5 which recovers in the detector output the 9.96 kilocycle sub-carrier signal, frequency-modulated by a 30 cycle reference phase signal, and the 30 cycle variable phase signal.

The reference phase sub-carrier signal is passed by a 9.96 kilocycle band pass filter 7 and is fed to the input circuit of an amplifier 9. The amplifier output is applied to the first control grid of a normally non-conducting multigrid gating tube 11.

Simultaneously, the variable phase signal is passed by a 30 cycle low pass filter 13, the output circuit of which includes a switch 15 which may be set in the "Azimuth" or the "To—From" position. Assuming the switch 15 is connected in the "Azimuth" position, the 30 cycle variable phase signal is successively coupled to a 90° phase shift network 17, an amplifier 19, an azimuth selector 21, and thence to a rectifier circuit 23. When the switch is in the "To—From" position the 90° phase shift network 17 is by-passed. The utility of the circuitry connected between the 30 cycle low pass filter 13 and the rectifier circuit 23 will subsequently be explained in order not to further complicate the description of the operation of the invention. The 30 cycle variable phase signal is coupled to a rectifier 23 in which the positive half-cycles of the signal are removed. The rectified variable phase signal is then coupled to a clipper circuit 25 in which the negative peaks of the variable phase signal are flattened. The substantially square wave output from the clipper 25 is applied to the second control grid of the aforementioned multigrid gating tube 11.

The multigrid gating tube 11 is biased so that the tube 11 conducts during the zero voltage period of the variable phase signal and is cut-off during the negative half cycle of that signal. The output from the gating tube 11 includes frequency variations of the sub-carrier frequency-modulated signal occurring during the zero voltage period of the modified variable phase signal. The output from the gating tube 11 is fed to a balanced discriminator 27 which is adjusted to provide zero output at 9.96 kilocycles. The gated bursts of sub-carrier signal energy are detected in the discriminator 27, the output of which is amplified in a D.-C. amplifier 29, preferably coupled to a D.-C. voltage responsive meter 31 suitably calibrated for translating the magnitude of the voltage applied to the device 31 into useful navigational information.

The D.-C. voltage responsive meter 31 is preferably a voltmeter capable of deflecting either to the right or to the left of a center scale reading of zero. Suitable phasing of the variable phase signal is obtained by means of the aforementioned circuitry coupled between the 30 cycle low pass filter 13 and the rectifier 23, in which the voltmeter 31 reads zero (mid-scale) when the aircraft is on course and deflects right or left if the craft deviates from a preselected course bearing.

Figure 2:
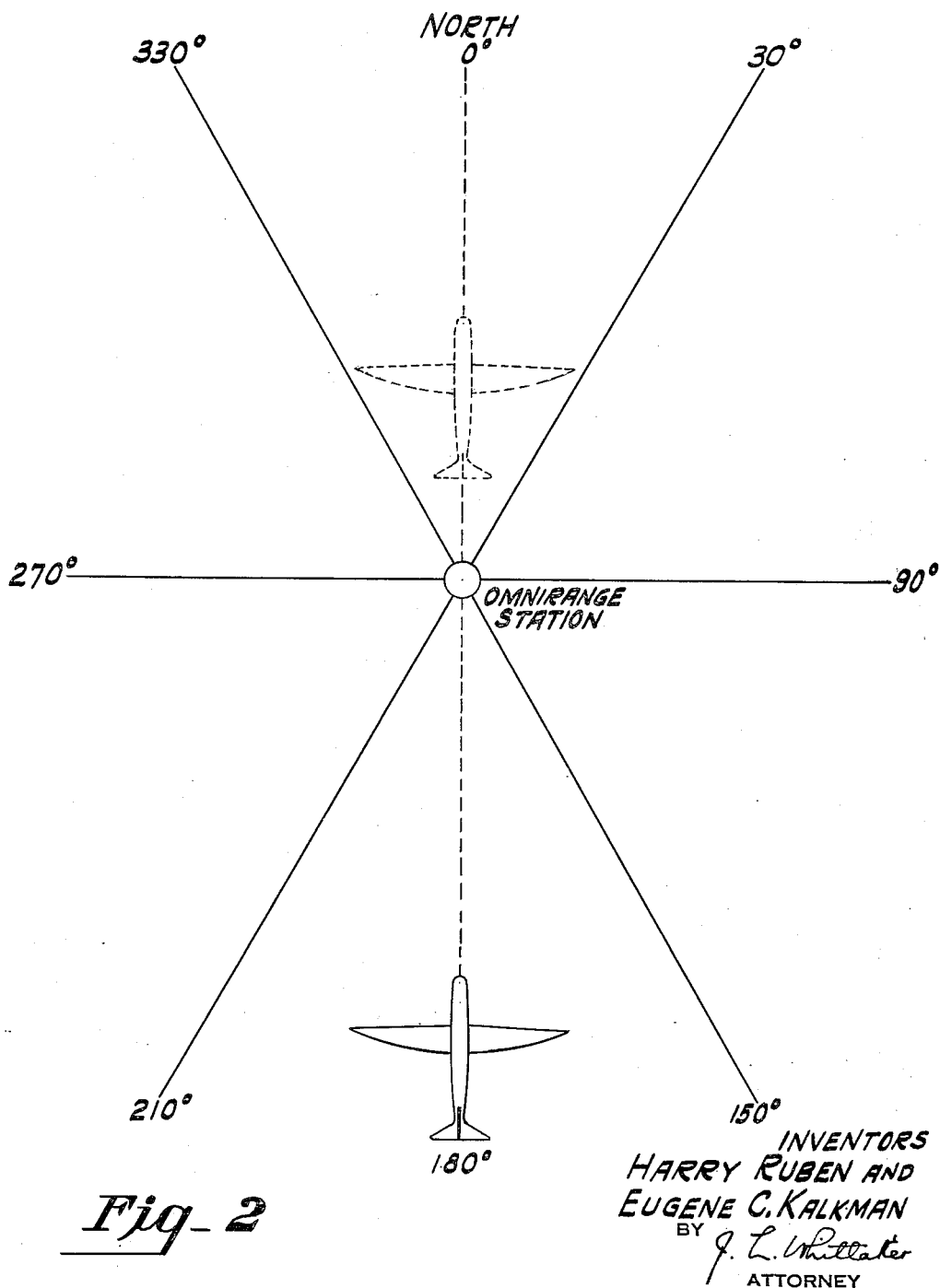
Fig. 2 is a map illustrating an aircraft flying a selected bearing of 0° in an area serviced by a ground omni-station.
Figure 3:
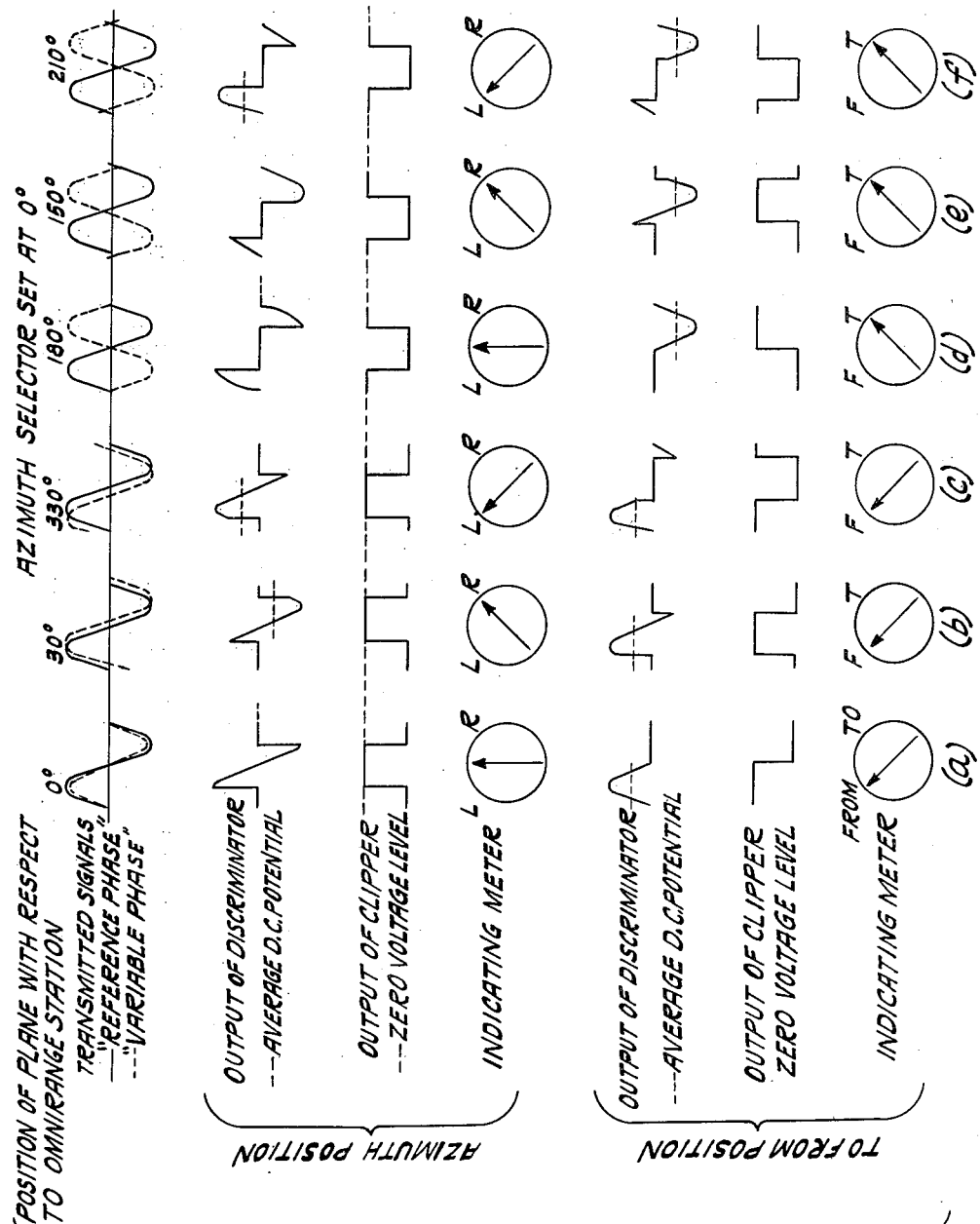
Fig. 3 illustrates a series of wave diagrams explanatory of the system of Figs. 1 and 2.

For example, referring to Fig. 2 of the drawing, a particular aircraft is located at a magnetic bearing of 180° with respect to the omni-station and is flying a 0° course. The variable phase signal then lags the reference phase signal by 180°. When the switch 15, in the output circuit of the 30 cycle filter 13 is in the "Azimuth" position, the variable phase signal is shifted in phase in a 90° phase shifter 17 such that it lags the reference signal by 270°. The variable phase signal is amplified in an amplifier 19 and is coupled to an azimuth selector 21, preferably a rotary phase shifting selsyn capable of shifting the phase of the signal from 0° to 360°. Since the preselected bearing of the aircraft is 0°, the azimuth selector 21 is set at zero and does not shift the phase of the variable phase signal. The signal is then rectified, clipped, and applied to the multigrid tube 11 thereby gating the reference phase signal. The 90° phase shifter 17 functions merely to phase the variable phase signal such that the meter 31 reads zero, rather than a maximum or a minimum, when the aircraft is on course. The azimuth selector 21 shifts the phase of the variable phase signal enabling a zero indication to be obtained from the meter 31 at any preselected bearing for which the aircraft is on course. When the magnetic bearing of the craft deviates, for example, to either 150° or 210° with respect to the omni-station, the phase relation of the reference and variable phase signals changes, as indicated in Fig. 3, and appropriate deflection of the meter 31 occurs. The sensitivity of the meter 31 may be such that it deflects full scale for a ten degree bearing deviation. The preselected bearing may be then maintained with relative ease.

When the switch 15 is thrown to the "To—From" position, the 90° phase shift network 17 is bypassed and the 30 cycle filter 13 is coupled to the amplifier 19. Assuming the aircraft is on course, the meter 31 indicates by deflection to the right of zero that the plane is flying toward the omni-station. After the plane passes over the station, the phase of the variable phase signal, as seen by the aircraft, shifts 180° and the meter accordingly deflects to the left of zero which indicates that the plane is flying away from the omni-station. Appropriate wave diagrams are illustrated in Fig. 3 for deviations from the preselected course of 0° bearing when the craft is flying away from the omni-station.

The omni-range receiver, according to the instant invention, affords the same navigational information derived from and is relatively simple compared to previous omni-range receivers. By effectively comparing the reference and variable phase signals at the relatively high 9.96 kc. sub-carrier signal frequency, powdered iron cores may be used, rather than laminated iron cores, in coupling the gating tube 11 to the discriminator, thereby reducing the weight of the receiver. This feature is extremely important in equipping light aircraft for omni-range navigation. A further feature, according to the invention, is the circuitry employed enabling a single meter 31 to be used for both "Azimuth" and "To—From" indications.

Coextensive with the broadest teachings of the invention it may be desirable to phase-modulate, rather than frequency-modulate, the sub-carrier signal. It is evident that the reference and variable phase signals may modulate the high-frequency carrier in the converse fashion; that is, the reference phase signal may amplitude-modulate the carrier and the variable phase signal may frequency-modulate the sub-carrier frequency signal.

What we claim to be our invention is:

1. For use in an omni-range radio navigation system in which a ground station furnishes flight information to aircraft within the service area of said ground station by transmitting a frequency-modulated sub-carrier reference phase signal amplitude-modulating a radio-frequency carrier and a variable phase signal modulating said radio-frequency carrier; the improvement comprising a receiver, located at said aircraft, for receiving and demodulating said modulated carrier to reproduce said reference and variable phase signals at the output of said receiver, means coupled to said receiver output for separating said received reference and variable phase signals, an electron discharge device having bias means associated therewith for biasing said device to cutoff, means coupled to said signal separating means for applying said reference phase signal to said discharge device without conduction therein, means coupled to said signal separating means for applying said variable phase signal to said discharge device for gating bursts of said frequency-modulated reference signal through said device, and means coupled to said discharge device for deriving an output signal dependent upon the phase relation of said reference and variable phase signals.

2. For use in an omni-range radio navigation system in which a ground station furnishes flight information to aircraft within the service area of said ground station by transmitting a frequency-modulated sub-carrier reference phase signal amplitude-modulating a radio-frequency carrier and a variable phase signal space-modulating said radio-frequency carrier; the improvement comprising a receiver, located at said aircraft, for receiving and demodulating said modulated carrier to reproduce said reference and variable phase signals at the output of said receiver, means coupled to said receiver output for separating said received reference and variable phase signals, an electron discharge device having bias means associated therewith for biasing said device to cutoff, means coupled to said signal separating means for applying said reference phase signal to said discharge device without conduction therein, means coupled to said signal separating means for shifting the phase of said variable phase signal in accordance with a desired flight course, means coupled to said phase shifting means for modifying the waveshape of said variable phase signal, means coupled to said phase shifting means for applying said modified variable phase signal to said discharge device for gating bursts of said frequency modulated reference signal through said device, means coupled to said gating means for deriving an output signal dependent upon the phase relation of said modified and phase shifted variable phase signal and said reference signal, and indicating means responsive to said output signal deriving means.

3. A receiver according to claim 2 wherein said means for shifting the phase of said variable phase signal includes an adjustable phase shift network.

4. A receiver according to claim 1 wherein said electron discharge device comprises a multigrid tube and said bias means biases said multigrid tube such that said tube conducts during the zero voltage period of said variable phase signal and is cut-off during the negative half-cycle of said variable phase signal.

5. A receiver according to claim 1 wherein said output signal deriving means includes a balanced discriminator responsive to frequency variations of said gated sub-carrier signal.

6. A receiver according to claim 2 wherein said indicating means responsive to said control signal deriving means comprises a meter device for selectively indicating aircraft bearing or course deviations.

7. A receiver according to claim 2 wherein said wave shape modifying means includes means for rejecting the positive half cycle of said variable phase signal.

8. A receiver according to claim 2 wherein said wave shape modifying means includes means for clipping the negative peaks of said variable phase signal.

9. A phase comparison circuit for determining the phase relation between a reference phase signal modulating a relatively higher frequency carrier signal and a variable phase signal substantially lower in frequency than said carrier signal comprising, a normally cutoff electron discharge device, connection means for applying said modulated carrier signal to said device without conduction therein, means responsive to said variable phase signal for modifying the wave shape thereof, and means coupled to said wave shape modifying means for applying said modified variable phase signal to said electron discharge device to gate therethrough portions of said carrier signal having a characteristic indicative of said phase relation.

10. A phase comparison circuit for determining the phase relation between a reference phase signal frequency-modulating a relatively higher frequency carrier signal and a variable phase signal substantially lower in frequency than said carrier signal comprising, a normally cutoff electron discharge device, connection means for applying said frequency-modulated carrier signal to said device without conduction therein, means responsive to said variable phase signal for modifying the wave shape thereof, means coupled to said wave shape modifying means for applying said modified variable phase signal to said electron discharge device to gate therethrough portions of said carrier signal having a frequency characteristic indicative of said phase relation.

References Cited in the file of this patent

UNITED STATES PATENTS

| Number | Name | Date |
| --- | --- | --- |
| 2,129,004 | Greig | Sept. 6, 1938 |
| 2,513,477 | Gubin | July 4, 1950 |
| 2,513,493 | Kliever | July 4, 1950 |
| 2,513,528 | Sohon | July 4, 1950 |